INVENTOR.
Paul Carn
BY Michael S. Striker
Agt.

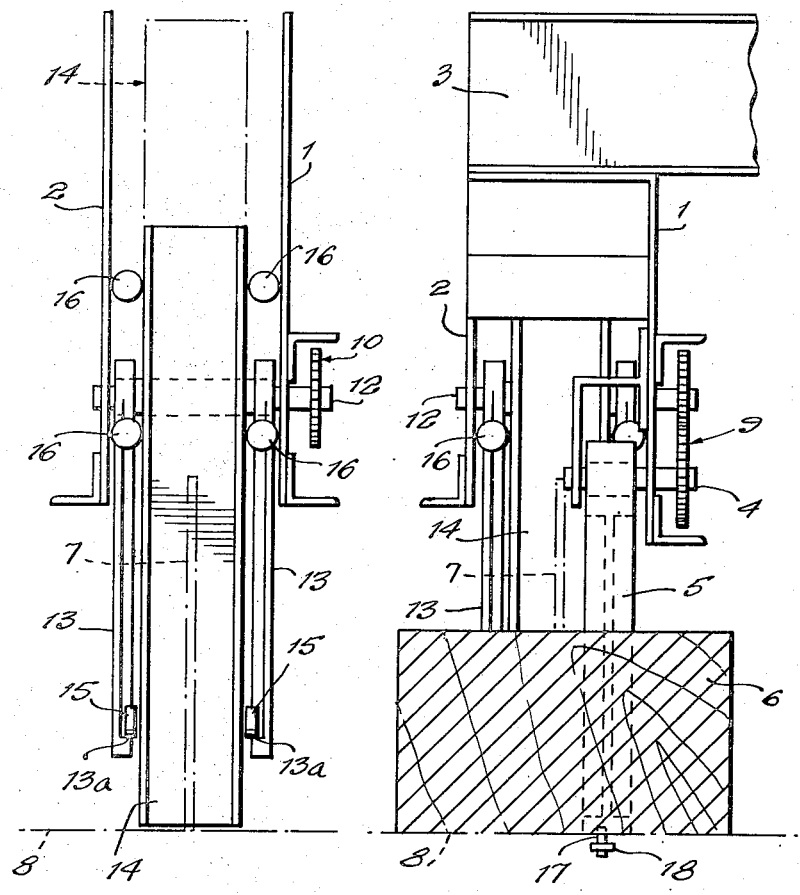

July 24, 1951 P. CARN 2,561,905
PROTECTING DEVICE FOR BAND SAWS, CIRCULAR SAWS, SPINDLE
MOLDING MACHINES, AND OTHER USES
Filed Oct. 21, 1947 3 Sheets-Sheet 3
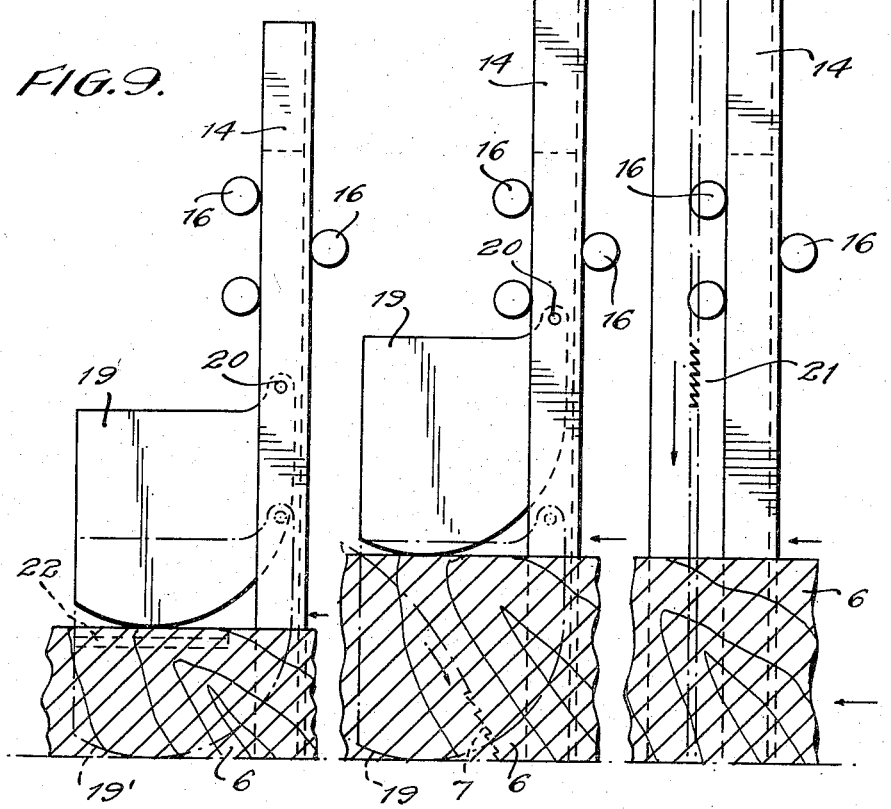
INVENTOR.
Paul Carn
BY Michael J. Striker
Agt.

Patented July 24, 1951

2,561,905

UNITED STATES PATENT OFFICE 2,561,905

PROTECTING DEVICE FOR BAND SAWS, CIRCULAR SAWS, SPINDLE MOLDING MACHINES, AND OTHER USES

Paul Carn, Levallois-Perret, France

Application October 21, 1947, Serial No. 781,104
In France November 9, 1946

6 Claims. (Cl. 144—251)

The invention has for its object to provide a protecting device for band-saws or circular-saws, spindle moulding or shaping machines, milling machines, surfacing machines, or other uses.

It is acknowledged in particular as regards circular saws, that the protecting devices which are generally used and which are based on the principle of covering the tool by means of the protector and of gradually retracting said protector by the action of the part to be worked, only perform their function in a very imperfect manner owing to the fact that they can also be lifted by the action of the operative's hand which has been left in the dangerous zone and is exposed to injury. Furthermore, as the protector is opaque, it prevents the tool from being seen and thereby makes the positioning of the cutting line of the part very unreliable. The inconvenience thus caused, and also the inefficiency of the protection, are the main reasons why the protectors are often removed by the operatives who disdain to use them.

The object of the invention is to overcome these drawbacks by providing a protecting device which is automatically placed in position, from the beginning of the operation, by the action of the part to be worked, at a height corresponding to the thickness of said part, in such a manner as only to uncover the useful portion of the tool, this being effected by means of members which are so arranged that the operative's hand cannot be passed through the protector and penetrate into the field of the tool.

It has also for its object to enable a perfect view of the tool to be obtained at all times.

A further object of the invention is to arrange the members of the protecting device in such a manner that, towards the end of the work, a first sudden dropping of one of said members forms a warning for the operative and the sudden dropping of the main protecting member prevents the operative's hand from penetrating into the dangerous zone.

These main results are obtained by means of the constructional principle of the protecting device which is the subject of the invention and which is characterised in particular in that:

1. It comprises, in combination: a main protecting member or protector which is located immediately adjacent the tool and is of such a shape and size that it amply covers said tool; an actuating cam, which is pivotally mounted in front of the protector so that it is encountered in the first place by the part to be worked, and which is of such a profile that it remains constantly tangential to the upper surface of said part when the same causes it to pivot; actuating levers mounted behind the protector which is carried along by their upward movement, said levers pivoting in the opposite direction to the actuating cam; and means for transmitting the lifting movement of said cam to said levers for actuating the protector.

2. The protector is preferably made of a transparent material.

3. Certain parts of the support of the protecting device, and also the levers for actuating the protector, may likewise advantageously be made of a transparent material.

4. Locking means may be provided for locking the protector in its low position so long as no work-piece is engaged in the device.

These main features, and also other secondary features which have not yet been disclosed, will be more clearly understood from the ensuing description of an embodiment of the protecting device, which is given merely by way of a non-limitative example and is diagrammatically illustrated in the accompanying drawings in which:

Fig. 2 is a transverse vertical section thereof along II—II (Fig. 1);

Fig. 3 is an elevational view along III—III (Fig. 1);

Figs. 5 and 6 are respectively diagrammatic elevational and plan views showing the use of the device for a band-saw;

Figs. 7 and 8 are similar views, showing the device equipped with a side guard in the case of its use with a circular saw; and Figs. 9 and 10 are similar views to the previous ones, showing the use of the device, with a side guard, for a spindle moulding machine.

Figure 1:
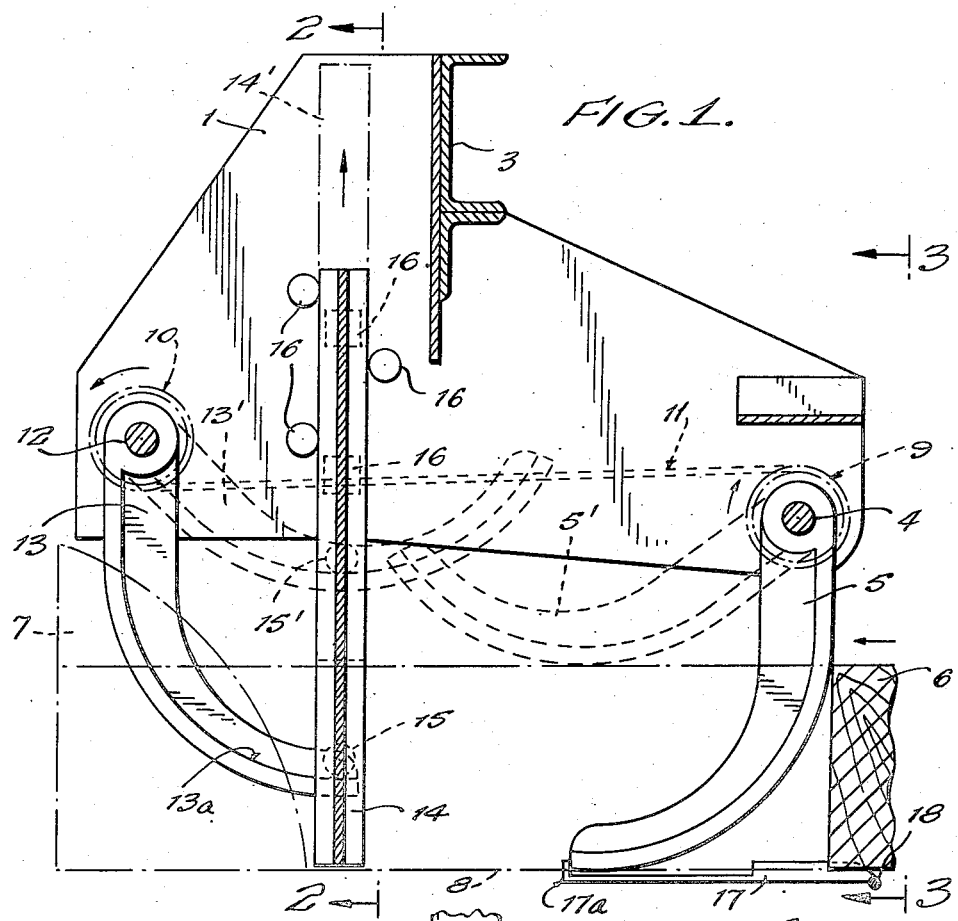
Fig. 1 is a general view of the protecting device in elevation and longitudinal vertical section along I—I (Fig. 9)
Figure 4:
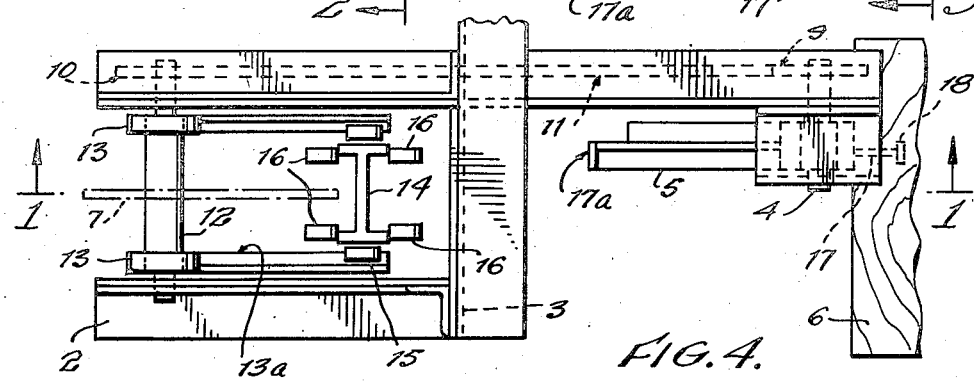
Fig. 4 is a top plan view.

As regards the device shown in Figs. 1 to 4, all its component members are mounted in a support formed by a rear plate 1 and a shorter front plate 2, which are connected together by a cross member 3. Said support is firmly held above the tool and according to cases, is fixed either to the ceiling of the workshop by means of vertical arms, or to a wall by means of brackets, or again to the edge of the work table by means of elements of suitable shape enabling it to be positioned adjustably.

On said support is mounted a spindle 4 on which is fixed a cam 5, or "actuating cam" which, when the work-piece 6 is not engaged, comes near to or into contact with the work table 8, in front of the tool which, in Figs. 1 to 4, comprises a circular saw 7. The spindle 4 is connected, for example by means of members or sprockets 9 and 10 and a connecting member or chain 11, to a spindle 12 on which are fixed levers 13, or "actuating levers," which pivot in the opposite direction to the actuating cam 5.

This pair of levers 13 supports a protecting member or protector 14, which is of the shape of a double T in the example of Figs. 1 to 4, or is U-shaped (Figs. 5 to 10), or is of other suitable shape, and which forms a strong, unbreakable flexible and preferably transparent element. It may advantageously be made of a synthetic resin of the type of that known by the name of "Plexiglas." Two rollers 15, fixed on either side of the vertical wings of the protector 14, each rest on a track 13a provided at the lower part of the corresponding actuating lever 13. The profile of the tracks 13a is identical to the external profile of the actuating cam 5. On the other hand, the vertical movements of the protector 14 are guided by rollers 16 mounted on the plates 1 and 2 of the support.

When no tool is being used, the actuating cam 5 is locked by means of a device comprising a lever 17 pivotally mounted about a spindle 18 housed in the thickness of the table 8, the end of said lever, which is formed by a resilient blade, being of the shape of a stop nose 17a.

As soon as a work-piece 6 is engaged, this device retracts of its own accord by the action of the weight of the work-piece and the pressure exerted by the operative's hand on said work-piece. As it is fed forwards, the work-piece 6 causes the cam 5 to pivot upwardly; said cam, owing to the shape of its profile, remains constantly tangential to the upper surface of the wood. It thus assumes the position shown in dotted lines at 5'. The spindle 4 on which the cam 5 is mounted, actuates, by means of the transmission 9— 11— 10, the levers 13 which, by pivoting in the opposite direction to the cam 5, move the protector upwards to 14', at just the suitable height to allow the piece 6 to pass.

During the whole time the work is in progress, the operative can push the work-piece while keeping his fingers outside the field of the protector 14. If, owing to negligence he pushes the work-piece 6 and leaves his fingers in the same plane as the tool, his hand necessarily encounters the protector 14 which stops it. If, in spite of all this, he pushes said protector, this action tends to make the same move downwards again and rotates the levers 13 towards the rear of the protector, so that the cam 5 itself tends to rotate towards the work table and the movement of the piece 6 is thus braked.

Towards the end of the operation, i. e. when the end of the work-piece escapes from the actuating cam 5, said cam suddenly drops downwards and thus gives a warning to the operative.

When the work-piece is almost completely split and has gone beyond the zone of the protector 14, said protector in its turn suddenly drops of its own accord. The height of the spindle 12 of the levers 13 may be calculated proportionally to the maximum thickness of the work-piece, so as to obtain in all cases a maximum drop of the protector, leaving, if desired, only room to pass a thin push rod, and thus providing complete safety up to the end of the operation. The device is then ready to receive a fresh work-piece.

It should be stressed that the arrangement of the various members of the device and the transparency of the protector 14 enable the operative never to lose sight of the line of the tool. The actuating levers 13 and the plates 1 and 2 of the support may also be transparent.

It should be noted, on the other hand, that the actuating cam 5 may accessorily perform the function of a presser, preventing the work-piece from moving backwards, owing to the jamming effect in the backward direction.

Figs. 5 and 6 show diagrammatically the use of the device for a band saw 21.

In order to prevent, in certain cases of use, for example with the spindle moulding machine 22 (Figs. 9 and 10) or even with the circular saw (Figs. 7 and 8), when it is required to use the saw for wood of greatly different thicknesses, the operative's hand from being able, by going round the wing of the protector, to come laterally into contact with the tool, the protector 14 may advantageously be combined with a lateral guard 19 which is preferably made of a transparent material like the protector itself. Said guard 19 is pivotally mounted inside the protector 14, for example on the same spindle 20 as the rollers 15.

While the work is in progress, as the protector 14 is moved into the raised position by the work-piece 6 in the manner explained, the guard 19 is also raised and rests on the work-piece. Towards the end of the operation, when the work-piece 6 has escaped from the protector 14, said protector falls on to the table 8 and the guard 19 pivots and remains in contact with the work-piece 6 until said work-piece itself escapes. The guard 19 then falls into contact with the table as shown at 19'.

It is of course understood that the invention is in no way limited to a particular embodiment and that modifications, improvements of details and the use of equivalent means may be devised, without thereby exceeding the scope of the invention.

I claim:

1. A protecting device for a woodworking machine tool, comprising in combination, a protecting member slidably mounted in proximity, and extending in front, of the whole useful woodworking part of the machine tool; at least one actuating lever rotatably mounted behind, and connected to, said protecting member; a first member integrally locked with said actuating lever; an actuating cam rotatably mounted in front of said protecting member and adapted to be rotated and lifted by a work piece, said actuating cam having a profile shaped so as to remain tangential to the upper face of the work piece in any position thereof in the woodworking machine tool; a second member integrally locked with said actuating cam; and a connecting member connecting said first and second members for inverse rotation for lifting the end of said actuating lever by the same distance as the end of said cam, when the latter is lifted by a work piece.

2. A protecting device for a woodworking machine tool, comprising in combination, a protecting member slidably mounted in proximity, and extending in front, of the whole useful woodworking part of the machine tool; at least one actuating lever rotatably mounted behind, and connected to, said protecting member; a first sprocket integrally locked with said actuating lever; an actuating cam rotatably mounted in front of said protecting member and adapted to be rotated and lifted by a work piece, said actuating cam having a profile shaped so as to remain tangential to the upper face of the work piece in any position thereof in the woodworking machine tool; a second sprocket integrally locked with said actuating cam; and a chain connecting said first and second sprockets and adapted to inversely rotate same for lifting the end of said actuating lever by the same distance as the end of said cam, when the latter is lifted by a work piece.

3. A protecting device for a woodworking machine tool, comprising in combination, a protecting member slidably mounted in proximity, and extending in front, of the whole useful woodworking part of the machine tool; at least one actuating lever rotatably mounted behind, and connected to, said protecting member; a first member integrally locked with said actuating lever; an actuating cam rotatably mounted in front of said protecting member and adapted to be rotated and lifted by a work piece, said actuating cam having a profile shaped so as to remain tangential to the upper face of the work piece in any position thereof in the woodworking machine tool; a second member integrally locked with said actuating cam; a connecting member connecting said first and second members for inverse rotation for lifting the end of said actuating lever by the same distance as the end of said cam, when the latter is lifted by a work piece; and a side guard pivoted to said protecting member and adapted to be lifted about the pivot thereof by a work piece.

4. A protecting device for a woodworking machine tool, comprising in combination, a protecting member slidably mounted in proximity, and extending in front, of the whole useful woodworking part of the machine tool, said protecting member having a cross-section having a main portion and two opposite flanges, said main portion and said flanges surrounding the front portion of the tool; at least one actuating lever rotatably mounted behind, and connected to, said protecting member; a first member integrally locked with said actuating lever; an actuating cam rotatably mounted in front of said protecting member and adapted to be rotated and lifted by a work piece, said actuating cam having a profile shaped so as to remain tangential to the upper face of the work piece in any position thereof in the woodworking machine tool; a second member integrally locked with said actuating cam; and a connecting member connecting said first and second members for inverse rotation for lifting the end of said actuating lever by the same distance as the end of said cam, when the latter is lifted by a work piece.

5. A protecting device for a woodworking machine tool, comprising in combination, a protecting member mounted for vertical sliding motion in proximity, and extending in front, of the whole useful woodworking part of the machine tool; at least one actuating lever rotatably mounted behind said protecting member, said actuating lever being curved towards the work table and forming a track; a roller rotatably connected to said protecting member and engaging said track so as to move along said track when said actuating lever is rotated; a first member integrally locked with said actuating lever; an actuating cam rotatably mounted in front of said protecting member and adapted to be rotated and lifted by a work piece, said actuating cam having a profile shaped so as to remain tangential to the upper face of the work piece in any position thereof in the woodworking machine tool; a second member integrally locked with said actuating cam; and a connecting member connecting said first and second members for inverse rotation for lifting the end of said actuating lever by the same distance as the end of said cam, when the latter is lifted by a work piece, said actuating lever and said actuating cam having similar curved shapes having each a concave side and facing each other with the concave sides thereof.

6. A protecting device for a woodworking machine tool, comprising in combination, a protecting member mounted for vertical sliding motion in proximity, and extending in front, of the whole useful woodworking part of the machine tool; at least one actuating lever rotatably mounted behind said protecting member, said actuating lever being curved towards the work table and forming a track; a roller rotatably connected to said protecting member and engaging said track so as to move along said track when said actuating lever is rotated; a first sprocket integrally locked with said actuating lever; an actuating cam rotatably mounted in front of said protecting member and adapted to be rotated and lifted by a work piece, said actuating cam having a profile shaped so as to remain tangential to the upper face of the work piece in any position thereof in the woodworking machine tool; a second sprocket integrally locked with said actuating cam; and a chain connecting said first and second sprockets and adapted to inversely rotate same for lifting the end of said actuating lever by the same distance as the end of said cam, when the latter is lifted by a work piece, said actuating lever and said actuating cam having similar curved shapes having each a concave side and facing each other with the concave sides thereof.

PAUL CARN.

REFERENCES CITED

The following references are of record in the file of this patent:

UNITED STATES PATENTS

| Number | Name | Date |
| --- | --- | --- |
| 997,720 | Troupenat | July 11, 1911 |
| 1,594,772 | Fournier | Aug. 3, 1926 |
| 2,008,391 | Hartzell et al. | July 16, 1935 |
| 2,240,983 | Conine | May 6, 1941 |

FOREIGN PATENTS

| Number | Country | Date |
| --- | --- | --- |
| 2,767 | Australia | July 13, 1926 |